March 18, 1952     R. ABELL     2,589,470
ENGINE DRIVING MECHANISM
Filed Jan. 25, 1951
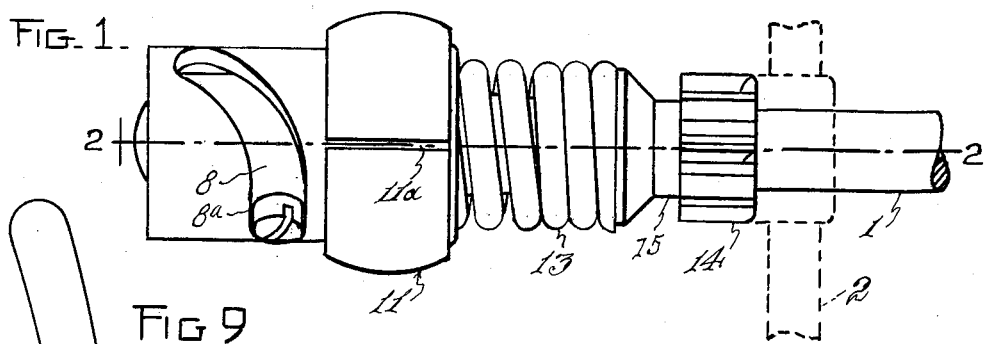
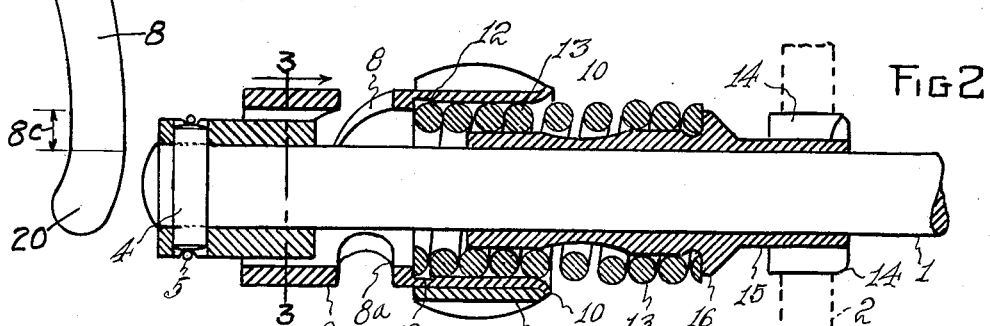
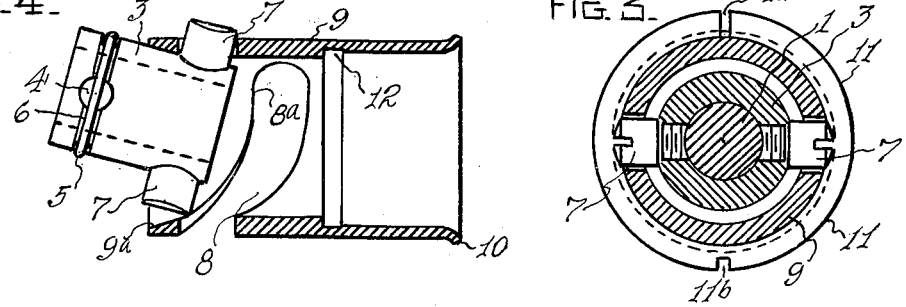
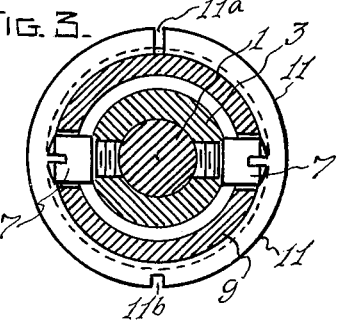
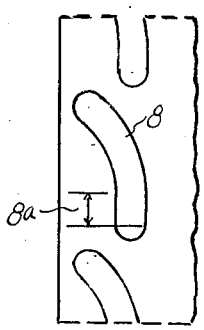
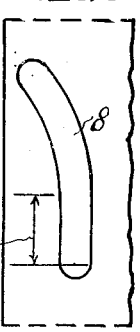
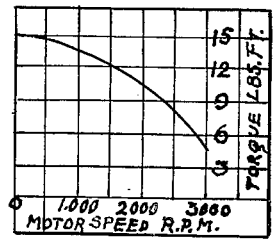
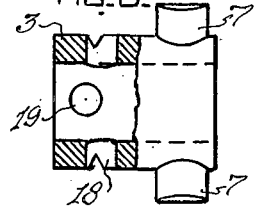
INVENTOR.
BY Rollin Abell
A. D. F. Libby
Attorney.

Patented Mar. 18, 1952

2,589,470

UNITED STATES PATENT OFFICE 2,589,470

ENGINE DRIVING MECHANISM

Rollin Abell, Chatham, Mass.

Application January 25, 1951, Serial No. 207,732

12 Claims. (Cl. 74—9)

This invention relates to inertia starter drive mechanism to engage the ring gear on the flywheel to start a gas engine. One object of the invention is to provide a mechanism of such design and proportions that it will reduce the shock and noise of engagement; eliminate the failure of engagement under adverse conditions when used in temperatures below zero, or when foreign particles or congealed oil or grease increases the friction of the mechanism to overcome the inertia; also to allow setting the driving pinion closer to the ring gear without rebound on disengagement causing an interference with the flywheel ring gear after it is in motion known as repeating.

Another object of the invention is to provide a driving element which can be assembled into the cam slots in a more practical way that permits interchanging and replacing present starter drives which have been standardized in large production.

Another object is to provide a shock absorbing spring between the driving and driven elements which not only reduces the shock by three different functions; namely, axially, torsionally, and finally slipping as a friction clutch below the maximum torque of the starting motor.

Another important object is to permit free rotary motion of starting motor shaft before axial motion is imparted to the driving pinion, and accelerate this motion gradually by a curved path cam in accordance with the law of inertia, instead of by a fixed helix angle, as with a screw thread, and reach full driving engagement with the ring gear in less than one revolution to reduce the shock to a minimum.

Another object is to reduce the axial motion of the inertia element to the least amount to still further reduce the shock of engagement without compromise.

Another object is to provide a cam forming part of the mechanism, a slot having a substantial length of its path at zero angle to eliminate the use of a spring to prevent interference of the pinion with the ring gear when the shaft is not horizontal as on a hill or steep grade.

Another object is to eliminate the counterbored recess in the pinion, and eliminate the secondary spring, thereby permitting the use of a smaller pinion as now required and avoiding the resistance of the spring, which opposes and reduces the effect of inertia.

This application is an improvement on my Patent No. 1,984,297 issued December 11, 1934, for an Engine Drive Mechanism. While both designs are based upon the same general principles, every part in each case is different. The first difference is the starting motor shaft which in the patent mentioned above is of necessity of two diameters or has a sleeve equivalent to one of the diameters to provide a shoulder for the secondary spring number 20 in Figures 2, 6 and 9 of the patent. In the present application there is no secondary spring, and the recess in the pinion is eliminated which permits the use of a smaller diameter pinion required in present production, to increase the ratio between the pinion and ring gear.

Another difference is in the spring which forms the clutch. The original spring (see Fig. 3 of the patent) was wound tapered like the frustum of a cone. The spring in the present case is wound cylindrically.

Another difference is the form of the cam slot which has zero angle for part of its length which is necessary for satisfactory operation.

Another difference is that the old style of removable trunnions are now automatically locked in the driver by the shaft or are integral with the driver. Another difference is the taper at the rear end of the cam to permit assembly of the driver trunnions into cam slots when the trunnions are non-removable from the drivers.

Another difference is the reduced diameter back of the pinion to avoid interference with spring and permits cutting a smaller pinion.

Other features will appear on reading the specifications taken with the annexed drawing, wherein Figure 1 is a side elevation full size of the engine drive mechanism of my present invention;

Figure 2 is a sectional view taken on a line similar to 2—2 of Figure 1 but with the device turned 90° on its horizontal axis;

Figure 3 is a view taken on line 3—3 of Figure 2 as defined;

Figure 4 is a modification of the cam tube in section and showing the method of assembling the driver with fixed trunnions, into the cam slots;

Figure 5 is a modified form of driver with cross holes in different planes, to provide a choice of positions in assembly on the drive shaft;

Figure 6 is a development on a reduced scale of the cam slots showing zero starting angle;

Figure 7 is a development on a reduced scale of a modification of cam slot with a single slot and longer zero angle;

Figure 8 is a chart showing torque reduction with speed;

Figure 9 shows full size, a modified form of a single cam slot.

In the various views like numbers refer to corresponding parts. In Figures 1 and 2, 1 is the starting motor shaft while the ring gear 2 on the engine is shown in broken lines. Operatively connected to the free end of the motor shaft 1 as by a pin 4 is a driver member 3. Preferably the pin 4 and the driver 3 have a groove 6 thereon to receive wire lock ring 5. In order to show lock ring 5 more prominently, it is shown being attached to the driver 3 in Figure 4 but it is to be understood that the pin 4 and the lock ring 5 would not be put into place until the driver has been inserted to the position shown in Figure 2 to receive the shaft 1. The driver 3 has a pair of oppositely disposed trunnions 7. As shown in Figure 3 the trunnions 7 are first screwed into the driver 3 so their inner ends project a short distance into the hole for the shaft 1 and then a reamer having a diameter of the shaft, is passed through the shaft hole to engage these projecting ends to form a concave surface therein to engage and grip, over a maximum area of the shaft 1 when it is inserted into the driver 3. The trunnions 7 are adapted to operate in the curved slots 8 that are located in the cam tube 9. Housed within the cam tube 9 is one end of a drive spring 13. A recess 12 is formed within the cam tube 9 to receive the inner end turn of the spring 13. The major portion of the spring 13 is carried on a sleeve 15 to which the pinion 14 is securely fastened or preferably forming an integral part therewith. The pinion sleeve 15 has a flange 16 against which the outer turn of the spring 13 engages. Preferably this end turn is ground off so as to engage a flat surface on the flange 16. As shown, the gear 14 is spaced a short distance from the flange 16 to permit clearance for necessary tools used in its manufacture.

Carried on the outer surface of cam tube 9 is an inertia ring 11 having a split at 11a, and a saw-cut or channel 11b opposite the split 11a. This saw-cut and split is for the purpose of increasing the flexibility of the inertia ring 11 whereby it may have relatively light frictional contact with the cam tube 9 which is provided with an upturned flange 10 to prevent axial movement of the ring 11 toward the gear 14.

It will be noted that there is no direct fastening means between the gear sleeve 15, the drive spring 13, the cam tube 9 and the inertia ring 11, so that the initial torque supplied by the driver through its trunnions 7 to the cam tube 9 is by friction alone, all of which attains the principal objects herein set forth.

In Figures 4 and 5 I have shown the trunnion 7 as an integral part of the driver 3 and when these parts are so constructed I have provided the outer end of the cam tube 9 with an annular integral bevel or taper 9a so that the driver unit may be moved into the tube 9 and then the shaft 1 inserted in place and fastened by the pin 4 and lock ring 5. In Figure 5 the driver 3 is provided with two sets of holes 18 and 19 for fastening the driver to the shaft 1, the object being to provide a choice of position of the pinion 14 in relation to the ring gear 2 and to take care of any errors that may exist in an axial direction. In Figure 6 I have shown a partial development of the cam slots which receive the trunnions 7. It will be noted that for the distance marked 8a the sides of the slot at one end are parallel for a given distance, to a transverse plane at right angles to the axis of the shaft 1, while in Figure 7 this distance 8b is considerably longer. I term these distances 8a and 8b as a zero angle. In other words, the sides of the slots are parallel and make no angle with each other, the purpose of which is to give a free motion of trunnions 7 in cam slots 8 before axial motion is started. This free motion has an axial value, i. e. it makes more positive engagement and prevents contact of pinion with ring gear by gravity and eliminates the use of the spring such as number 20 in my patent previously referred to. From the many tests that I have made I have found under certain conditions that the inertia ring 11 may be omitted, if there is no direct connection and only a frictional engagement between it and the cam tube 9 but it adds to increase the inertia of the device under certain conditions of operation. It has the tendency to move axially forward when the pinion starts its forward motion but is held up by the flange 10, but there is no tendency for the ring 11 to move in the opposite direction. On disengagement, when axial motion is changed to rotary motion and when the trunnions hit the end of the cam slot, there is quite a blow and the friction of this ring allows it to slip on the cam tube and expend its energy by slipping on the tube and preventing rebound of the driver trunnions in the cam slots. As a matter of fact, this action happens so quickly that only the sharpest eye can follow it, but I have further found that if the ring 11 was part of the cam tube 9 it would rebound more and the pinion would bounce back into the fly wheel which is then turning and make an objectionable noise caused by rubbing on the teeth.

All these inertia devices depend on speed and many of the devices now in operation in cars will not operate on half operating speed but my structure herein disclosed will work at one-quarter normal speed because I have found that the inertia is much more than prior art devices of this kind and the frictional resistance of advancing the pinion on the shaft is less than half than on a threaded shaft. Generally speaking the free running speed of the starter is about 2500 R. P. M. and at that speed the starting motor develops 7.5 foot lbs. torque. It takes about 5 ft. lbs. torque to turn the ordinary engine as made today over after it is in motion. The slipping point therefore must be above this to overcome the inertia and bring it up to starting speed. In my patent previously referred to, the principles of the slipping are set forth while in the present case they are directed to an arrangement whereby the slipping or clutching may be at about one-half of the maximum torque or at the speed where it is turning the motor over and from the tests that I have made I find that the shock of engagement is less than that produced by the structure of my patent referred to and the operation is much quieter. Also the rebound angle is such that the pinion can be satisfactorily placed closer to the fly wheel without getting into difficulty.

This rebound and creeping of the trunnions caused by the quick stop of a car is better taken care of by the form of slot shown in Figure 9 wherein the idle end 20 is formed approximately as shown, and there may be short zero angularity at the space 8C although the object can be accomplished by giving the slot a sharper bend than that portion of it numbered 8 in Figures 6, 7, and 9.

From what has been said it will be seen and understood by one familiar with these starting motor devices, that the present invention is much simpler in construction, cheaper in cost and more efficient in operation.

Having thus described my invention, I claim:

1. An engine starter including an operating shaft, a sleeve slidably mounted on said shaft and having a flange spaced a suitable distance from one of its ends, a pinion fastened to one end of the sleeve at a relatively short distance from said flange for engaging a starting gear on an engine, a single longitudinally coiled spring frictionally mounted on said sleeve and having one end engaging said flange on the side away from said pinion, a tubular member having one end frictionally embracing a part of said spring turns away from said flange while its opposite end has diametrically positioned cam slots therein, a driving member fastened to the free end of the driving shaft and having trunnions positioned in said cam slots for the purposes described.

2. An engine starter including an operating shaft, a sleeve slidably mounted on said shaft, a pinion fastened to one end of the sleeve for engaging a starter gear on an engine, said sleeve having an annular flange spaced a distance from the pinion, the flange having an inner flat annular surface, a coil spring having an end turn with a flat face to engage the flat surface on said flange, the spring extending along the sleeve with some turn thereof extending beyond the end of the sleeve, a tubular member enclosing said extending turns as well as some on the sleeve, said tubular member extending a substantial distance beyond the end of the spring, and having cam slots oppositely disposed in this extending end, a driving member fastened to the free end of the driving shaft and having trunnions positioned in said cam slots, the drive from said driving member through the parts mentioned to the pinion being by frictional clutch action as and for the purposes described.

3. An engine starter as set forth in claim 1 further defined in that an inertia ring is frictionally mounted on that part of the tubular member that embraces said spring coils, said ring being split across its width and also having a slot opposite the split and extending in the same direction as the slit, for the purpose described.

4. An engine starter as set forth in claim 1 further defined in that the pinion and flanged sleeve are integral as is also the driving member and its trunnions.

5. An engine starter as set forth in claim 2 further defined in that an inertia ring is frictionally mounted on that part of the tubular member that embraces said spring turns with an upturned flange on the end of the tubular member toward the pinion to prevent axial movement of said ring on said tubular member.

6. An engine starter as set forth in claim 2 further defined in that an inertia ring is frictionally mounted on that part of the tubular member that embraces said spring turns, said ring being split across its width and also having a slit opposite the split while the tubular member has an upturned flange on its end toward the flange on said sleeve to prevent axial movement of said ring on said tubular member.

7. An engine starter as set forth in claim 2 further defined in that the cam slots at the idle position are straight for a substantial distance for the purposes described.

8. An engine starter including an operating shaft, a sleeve slidably mounted on said shaft, a pinion fastened to one end of the sleeve for engaging a starting gear on an engine, said sleeve having an annular flange spaced a distance from the pinion, the flange having an inner flat annular surface, a coil spring having an end turn with a flat face to engage the flat surface on said flange, the spring extending along the sleeve with some turn thereof extending beyond the end of the sleeve, a tubular member enclosing said extending turns as well as some on the sleeve, said tubular member extending a substantial distance beyond the end of the spring and having at least one cam slot which at the idle position has a straight circular portion for a substantial distance, a driving member fastened to the free end of said shaft and having a trunnion positioned in said cam slot whereby when in the idle position the shaft and pinion cannot slide ahead by gravity as described.

9. An engine starter comprising a motor having a rotating shaft on which is mounted an inertia operated mechanism, one element of which is a tubular member having at least one cam slot therein, said tubular member connected to the shaft by a driving element having at least one lock pin going through the element and shaft, the shaft having a groove therein and a lock ring fitting in said groove and further having at least one trunnion to engage a cam slot in said tubular member, said trunnion contacting the shaft on an arc of a circle having the same radius as said shaft end in the driving element to form a positive engagement on the shaft.

10. An engine starter comprising a motor having a rotating shaft on which is mounted an inertia operated mechanism, including a tubular member having curved cam slots therein, a driver locked to the shaft and having parts engaging said cam slots, said tubular member being free to move axially, a ring on the outer surface of said tubular member at the end opposite said slots to increase the force of inertia, said ring being operatively held by friction but free to turn under shock of rotation, and held in one position axially by a flange on said tubular member.

11. An engine starter comprising a motor having a rotating shaft on which is mounted an inertia operated mechanism including, a cam tube having curved cam slots therein, a driver fastened to the shaft and having trunnions extending into said slots for imparting axial motion to the inertia operated mechanism, a pinion having an extended flanged sleeve mounted freely on the shaft, a coil spring carried on the sleeve with one end engaging said flange and extending into the cam tube and having a clutch engagement with both the sleeve and cam tube with a predetermined torque capacity less than the maximum torque of the motor.

12. An engine starter including an operating shaft, a sleeve slidably mounted on said shaft, a pinion fastened to one end of the sleeve for engaging a starting gear on an engine, a flange on said sleeve spaced a suitable distance from the pinion, a single longitudinally coiled spring frictionally mounted on said sleeve in spaced distance from said pinion as defined by said flange which forms a stop for one end of said spring, a tubular member having one end frictionally embracing a part of said spring turns away from said flanges while its opposite end has at least one curved cam slot therein, said cam slot at idle position of the starter having a greater curvature than at any other point for the purpose described, a driving member fastened to the free end of said shaft and having a trunnion operatively positioned in said cam slot.

ROLLIN ABELL.

REFERENCES CITED

The following references are of record in the file of this patent:

UNITED STATES PATENTS

| Number | Name | Date |
| --- | --- | --- |
| 1,653,338 | Brisbois | Dec. 20, 1927 |
| 1,984,297 | Abell | Dec. 11, 1934 |
| 2,248,652 | Ysskin | July 8, 1942 |
| 2,469,792 | Buxton et al. | May 10, 1949 |